(12) United States Patent
Seo et al.

(10) Patent No.: US 12,488,522 B2
(45) Date of Patent: Dec. 2, 2025

(54) DISPLAY APPARATUS AND CONTROL METHOD THEREOF

(71) Applicant: SAMSUNG ELECTRONICS CO., LTD., Suwon-si (KR)

(72) Inventors: Jangwon Seo, Suwon-si (KR); Ahyeon Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 17/963,654

(22) Filed: Oct. 11, 2022

(65) Prior Publication Data

US 2023/0120394 A1 Apr. 20, 2023

Related U.S. Application Data

(63) Continuation of application No. PCT/KR2022/012393, filed on Aug. 19, 2022.

(30) Foreign Application Priority Data

Oct. 18, 2021 (KR) .......................... 10-2021-0138328

(51) Int. Cl.
  *G06T 11/60* (2006.01)
  *G06V 10/764* (2022.01)
(52) U.S. Cl.
  CPC ............ *G06T 11/60* (2013.01); *G06V 10/764* (2022.01)
(58) Field of Classification Search
  CPC .......... G06T 11/60; G06T 3/40; G06V 10/764
  See application file for complete search history.

(56) References Cited

U.S. PATENT DOCUMENTS 7,162,102 B2 * 1/2007 Cahill ..................... G06T 11/00
                                                    382/284
8,305,478 B2   11/2012 Ito
                       (Continued)

FOREIGN PATENT DOCUMENTS

JP        2003-532205 A    10/2003
JP           4950074 B2     6/2012
                       (Continued)

OTHER PUBLICATIONS

International Search Report dated Dec. 5, 2022, issued by the International Searching Authority in counterpart International Application No. PCT/KR2022/012393 (PCT/ISA/210).

(Continued)

*Primary Examiner* — Ming Wu
(74) *Attorney, Agent, or Firm* — Sughrue Mion, PLLC

(57) ABSTRACT

A display apparatus includes a display, a memory configured to store layout information; and one or more processors configured to, based on the layout information, control the display to display a plurality of thumbnail images corresponding to a plurality of contents, respectively. The one or more processors is further configured to: obtain aspect ratios of thumbnail images, which are to be arranged in a same line according to the layout information, among the plurality of thumbnail images; identify a majority aspect ratio among the obtained aspect ratios; and control the display to display the thumbnail images arranged in the same line to have a vertical length that corresponds to the identified majority aspect ratio.

10 Claims, 9 Drawing Sheets

(56) References Cited

U.S. PATENT DOCUMENTS

| | | |
|---|---|---|
| 8,484,681 B2 | 7/2013 | Koo et al. |
| 9,113,080 B2 | 8/2015 | Choi et al. |
| 9,578,248 B2 | 2/2017 | Choi et al. |
| 9,674,236 B2 | 6/2017 | Wong et al. |
| 10,101,612 B2 * | 10/2018 | Im .................... G02F 1/133621 |
| 10,198,147 B2 | 2/2019 | Da Silva Ramos et al. |
| 10,346,704 B2 | 7/2019 | Kim et al. |
| 2002/0040375 A1 | 4/2002 | Simon et al. |
| 2010/0095219 A1* | 4/2010 | Stachowiak ........ G06F 16/9562 |
| | | 715/745 |
| 2010/0302408 A1 | 12/2010 | Ito |
| 2011/0074824 A1 | 3/2011 | Srinivasan et al. |
| 2011/0154406 A1 | 6/2011 | Koo et al. |
| 2014/0104477 A1 | 4/2014 | Choi et al. |
| 2015/0172329 A1 | 6/2015 | Wong et al. |
| 2015/0341563 A1 | 11/2015 | Choi et al. |
| 2018/0032830 A1 | 2/2018 | Kim et al. |
| 2020/0034023 A1* | 1/2020 | Sakaino .............. G06F 3/04817 |

FOREIGN PATENT DOCUMENTS

| | | |
|---|---|---|
| JP | 6589302 B2 | 10/2019 |
| JP | 6865721 B2 | 4/2021 |
| KR | 10-2007-0041078 A | 4/2007 |
| KR | 10-2015-0092485 A | 8/2015 |
| KR | 10-1558507 B1 | 10/2015 |
| KR | 10-1655807 B1 | 9/2016 |
| KR | 10-2018-0012064 A | 2/2018 |
| KR | 10-2018-0117619 A | 10/2018 |
| KR | 10-1990089 B1 | 6/2019 |
| KR | 10-2197567 B1 | 1/2021 |

OTHER PUBLICATIONS

Written Opinion dated Dec. 5, 2022, issued by the International Searching Authority in counterpart International Application No. PCT/KR2022/012393 (PCT/ISA/237).

* cited by examiner

DISPLAY APPARATUS AND CONTROL METHOD THEREOF

CROSS-REFERENCE TO RELATED APPLICATION

This application is a bypass continuation of International Application No. PCT/KR2022/012393, filed on Aug. 19, 2022, which is based on and claims priority to Korean Patent Application No. 10-2021-0138328, filed on Oct. 18, 2021, in the Korean Intellectual Property Office, the disclosures of which are incorporated by reference herein in their entireties.

BACKGROUND

1. Field

Embodiments of the disclosure relates to a display apparatus and a control method thereof, and more particularly, to a display apparatus which displays a plurality of thumbnail images and a control method thereof.

2. Description of Related Art

In recent years, various electronic apparatuses are developed with development of electronic technologies. Particularly, in recent years, a display apparatus which receives contents from various content providers and aligns and displays thumbnail images of each content on a screen to allow viewing of various contents is being developed.

In the related art, when displaying thumbnail images having various aspect ratios by arranging those in a horizontal direction on a screen, vertical lengths of the thumbnail images are adjusted to be the same as each other to evenly arrange the screen configuration. However, when displaying a thumbnail image having a horizontal length longer than a vertical length (e.g., image with a ratio of 16:9) and a thumbnail image having a horizontal length shorter than a vertical length (e.g., image with a ratio of 2:3) to have the same vertical direction, there is a problem that the thumbnail image having a relatively shorter horizontal length is not properly displayed.

In addition, in a case where the thumbnail images having different aspect ratios are arranged along the same line in sequence, there is a problem that sizes of the thumbnail images to be displayed on the display are determined without consideration of the aspect ratio that forms a majority in the corresponding line.

SUMMARY

Embodiments of the disclosure is to solve the above problems and an objective of the disclosure is to provide a display apparatus which provides a plurality of thumbnail images by considering aspect ratios of the thumbnail images and a size of the display and a control method thereof.

According to an aspect of an example embodiment, provided is a display apparatus including: a display; a memory configured to store layout information; and one or more processors configured to, based on the layout information, control the display to display a plurality of thumbnail images corresponding to a plurality of contents, respectively, wherein the one or more processors is further configured to: obtain aspect ratios of thumbnail images, which are to be arranged in a same line according to the layout information, among the plurality of thumbnail images; identify a majority aspect ratio among the obtained aspect ratios; and control the display to display the thumbnail images arranged in the same line to have a vertical length that corresponds to the identified majority aspect ratio.

The one or more processors may be further configured to: based on a size of the display not exceeding a predetermined standard, determine sizes of the plurality of thumbnail images in proportion to the size of the display; and based on the size of the display exceeding the predetermined standard, determine a size of each thumbnail image of the plurality of thumbnail images as a threshold value.

The one or more processors may be further configured to: based on the majority aspect ratio of a horizontal length to a vertical length being 2:3, control the display to display the thumbnail images arranged in the same line to have a first vertical length; and based on the majority aspect ratio of the horizontal length to the vertical length being 16:9, control the display to display the thumbnail images arranged in the same line to have a second vertical length, which is less than the first vertical length.

The display apparatus may further include a communication interface configured to receive, from a server apparatus, the plurality of thumbnail images and metadata related to the plurality of thumbnail images, wherein the one or more processors is further configured to identify an aspect ratio of each thumbnail image of the plurality of thumbnail images based on the metadata.

According to an aspect of an example embodiment, provided is a method of displaying a thumbnail image in a display apparatus, the method including: obtaining a plurality of thumbnail images corresponding to a plurality of contents, respectively; obtaining aspect ratios of thumbnail images, which are to be arranged in a same line according to layout information, among the plurality of thumbnail images; and displaying the thumbnail images arranged in the same line to have a vertical length that is determined based on the aspect ratios of the thumbnail images.

The method may further include: setting a vertical length of a thumbnail image having a first aspect ratio, in which a vertical length is longer than a horizontal length, among the plurality of thumbnail images to a first length; and setting a vertical length of a thumbnail image having a second aspect ratio, in which a horizontal length is longer than a vertical length, among the plurality of thumbnail images to a second length, which is less than the first length.

The method may further include: classifying thumbnail images having a same aspect ratio among the plurality of thumbnail images, and displaying the classified thumbnail images arranged in the same line, wherein the classified thumbnail images arranged in different lines have different vertical lengths.

The method may further include: identifying thumbnail images to be arranged in the same line according to layout information; identifying a majority aspect ratio among the aspect ratios of the thumbnail images to be arranged in the same line; and displaying the thumbnail images arranged in the same line to have a vertical length corresponding to the identified majority aspect ratio.

The displaying the thumbnail images arranged in the same line to have the vertical length corresponding to the identified majority aspect ratio may include: based on the majority aspect ratio being 2:3, displaying the thumbnail images arranged in the same line to have a first vertical length; and based on the majority aspect ratio being 16:9, displaying the thumbnail images arranged in the same line to have a second vertical length, which is shorter than the first vertical length.

The method may further include: based on a size of a display provided in the display apparatus not exceeding a predetermined standard, determining sizes of the plurality of thumbnail images in proportion to the size of the display; and based on the size of the display exceeding the predetermined standard, determining a size of each thumbnail image of the plurality of thumbnail images as a threshold value.

According to an aspect of an example embodiment, provided is a server apparatus including: a communication interface configured to perform communication with a display apparatus; a memory configured to store a content, a thumbnail image for the content, and layout information; and one or more processors configured to provide data for a thumbnail screen to the display apparatus via the communication interface, based on the thumbnail screen being stored in the memory, wherein the thumbnail screen is such that vertical lengths of thumbnail images arranged in the same line in the thumbnail screen has a length corresponding to a majority aspect ratio among aspect ratios of the thumbnail images arranged along the same line.

The one or more processors may be further configured to: based on the majority aspect ratio being 2:3, provide the thumbnail screen including the thumbnail images arranged in the same line to have a first vertical length; and based on the majority aspect ratio being 16:9, provide the thumbnail screen including the thumbnail images arranged in the same line to have a second vertical length, which is shorter than the first vertical length.

BRIEF DESCRIPTION OF THE DRAWINGS

The above and other aspects, features, and advantages of various embodiments of the disclosure will be more apparent from the following description taken in conjunction with the accompanying drawings.

DETAILED DESCRIPTION

Figure 1:
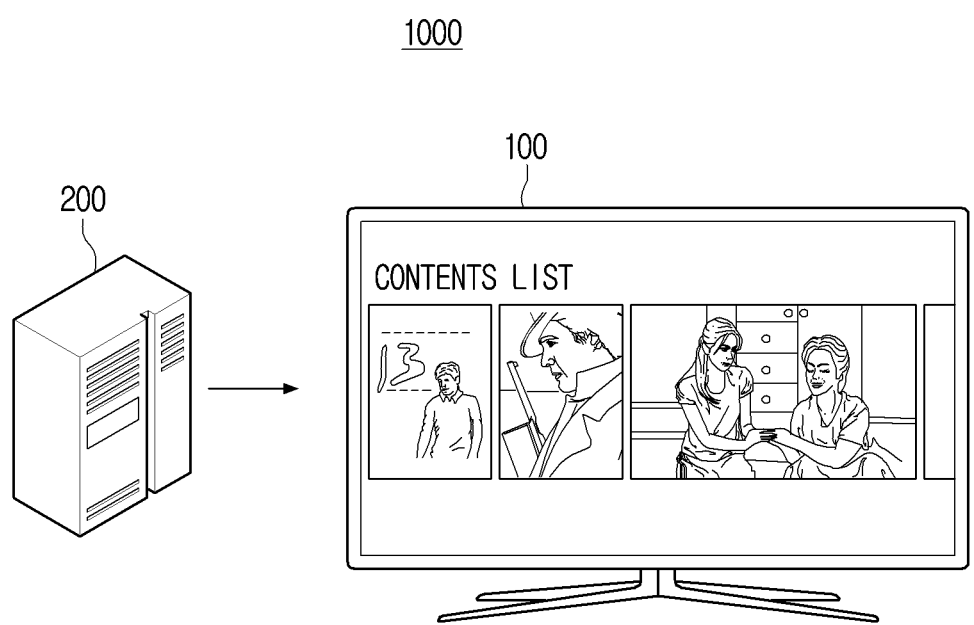
FIG. 1 is a diagram schematically illustrating an operation of a display apparatus to display a plurality of thumbnail images corresponding to contents according to an embodiment.

The examples described below are exemplified for understanding of the disclosure and it should be understood that the disclosure may be modified and performed variously unlike in the examples described herein. However, in describing the disclosure, a detailed description of the related art or configuration may be omitted when it is determined that the detailed description may unnecessarily obscure a gist of the disclosure. In addition, the accompanying drawings may not be illustrated with actual scales but may be illustrated with enlarged dimensions of some elements, for the understanding of the disclosure.

The terms used in the specification and claims have been selected as general terms as possible in consideration of functions in the embodiments of the disclosure. But, these terms may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, if there are no specific term definitions.

In describing the disclosure, it should be understood that the order of each step is not limited, unless a previous step should be performed before a subsequent step logically and in time. In other words, other than the above exceptions, the gist of the disclosure is not affected even if the process described as the subsequent step is performed before the process described as the previous step, and a scope of a right also should be defined regardless of the order of steps.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

The expressions "first," "second" and the like may be used for describing various elements, but the elements may not be limited by the expressions. The expressions may be used only to distinguish one element from another. For example, a first element may be referred to as a second element and the second element may also be similarly referred to as the first element, while not departing from the scope of a right of the disclosure.

Further, in the specification, elements necessary for describing each embodiment of the disclosure are described, and accordingly, there is no limitation thereto. Therefore, some elements may be changed or omitted and other elements may be added. In addition, the elements may be divided and disposed in different independent devices.

The embodiments of the disclosure will be described in detail with reference to the accompanying drawings and description in the accompanying drawings, but the disclosure is not limited by the embodiments.

Hereinafter, the disclosure will be described in detail with reference to the drawings.

FIG. 1 is a diagram schematically illustrating an operation that a display apparatus receives contents from an external apparatus and displays a plurality of thumbnail images corresponding to the contents according to an embodiment.

Referring to FIG. 1, a system 1000 (e.g., a thumbnail image display system) according to an embodiment of the disclosure may include a display apparatus 100 and a server apparatus 200.

The display apparatus 100 is an apparatus including a display for providing visual contents and a user interface to a user and may be implemented as various types of apparatuses such as a TV, a smart TV, an Internet TV, a web TV, an Internet Protocol Television (IPTV), digital signage, a PC, a tablet, and the like.

The display apparatus 100 may receive a plurality of contents from a content provider and receive thumbnail images corresponding to the plurality of contents, respectively. The content provider may include at least one of a content providing machine and a content provider. The content providing machine may be implemented as a set-top box, a Blu-ray player, or the like connected to the display apparatus 100. The content provider may provide contents through a server using an application (e.g., YouTube™, Netflix™, or the like) installed on the display apparatus 100. Hereinafter, for convenience of description, the embodiment will be described by assuming that the display apparatus 100 receives contents from the server apparatus 200.

The display apparatus 100 may receive contents, thumbnail images corresponding to the contents, metadata related to the contents, and the like from the server apparatus 200 which provides the contents.

The display apparatus 100 may display the thumbnail images according to stored layout information. For example, the display apparatus 100 may display the thumbnail images by arranging the thumbnail images respectively corresponding to the plurality of in one row in sequence or arrange the thumbnail images in a plurality of rows by classifying the thumbnail images by features of the contents. However, there is no limitation thereto, and the plurality of thumbnail images may be arranged in various layouts such as arranging the thumbnail images by dividing the thumbnail images into a plurality of rows or the like.

Herein, the thumbnail image is a representative image schematically representing a content, and in a case of a video content, the thumbnail image may be one image of a plurality of frames included in the video content and may be, for example, a poster image of a movie content or a drama series content.

When the plurality of thumbnail images are to be arranged in at least one row, the display apparatus 100 may obtain an aspect ratio of each of the thumbnail images to be arranged in the same row and identify a majority aspect ratio among the obtained aspect ratios. Herein, the aspect ratio of the thumbnail image is a ratio of a horizontal length to a vertical length of an image and there are thumbnail images having various aspect ratios such as 2:3, 16:9, 1:1, and the like. Herein, the term "majority" means that a ratio of the number of thumbnail images having the majority aspect ratio, among the aspect ratios of the thumbnail images, to the total number of the thumbnail images to be included in the thumbnail screen is equal to or greater than a threshold (e.g., 50%, 70%, etc.).

For example, the display apparatus may obtain the aspect ratio of each of the thumbnail images to be arranged in the same row, and if the number of thumbnail images having an aspect ratio of 2:3 is larger than the number of thumbnail images having other aspect ratios, the display apparatus may identify the ratio of 2:3 as the majority of aspect ratios (or majority aspect ratio).

When the majority of aspect ratios is identified, the display apparatus 100 may display the thumbnail images by adjusting sizes of the thumbnail images in a manner such that, after adjustment, the plurality of thumbnail images arranged in the corresponding row have the same vertical length. Herein, the vertical length applied to all of the thumbnail images arranged in the same row may be set to a length corresponding to the majority of aspect ratios. In other words, a predetermined vertical length of the thumbnail image may be different for each aspect ratio such as 2:3 or 16:9, and when the majority of aspect ratios is identified, the sizes of the thumbnail images may be adjusted so that the vertical lengths of all thumbnail images arranged in the same row is the vertical length corresponding to the majority of aspect ratios.

Accordingly, the display apparatus may display thumbnail images having the corresponding aspect ratios in a size suitable to the thumbnail image having the aspect ratio that forms a majority in the same row of thumbnail images, and may also align the remaining thumbnail images having other aspect ratios in a size adjusted to have the same vertical length. This will be described in detail with reference to the drawings below.

The operation of the display apparatus 100 may be processed on the server apparatus 200. For example, the server apparatus 200 may form a thumbnail screen based on the content, the thumbnail image for the content, and the layout information, and provide data for the thumbnail screen to the display apparatus 100. In this case, the server apparatus 200 may form the thumbnail screen to display the vertical lengths of the thumbnail images arranged in the same line on the thumbnail screen as the length corresponding to the majority of aspect ratios among the aspect ratios of the thumbnail images arranged in the same line. The display apparatus 100 may receive thumbnail screen information from the server 200 and display the thumbnail screen information through the display of the display apparatus 100.

Figure 2:
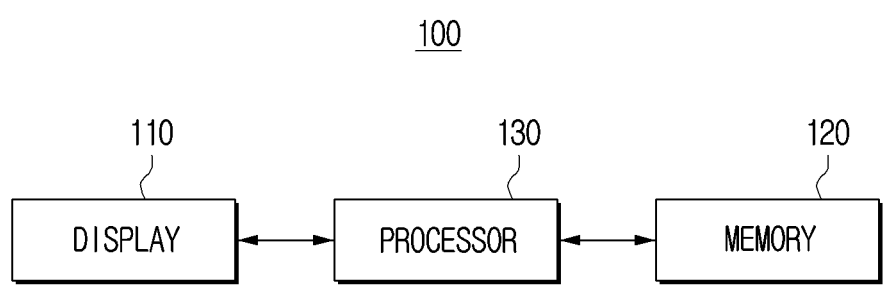
FIG. 2 is a block diagram illustrating a configuration of a display apparatus according to an embodiment.

FIG. 2 is a block diagram illustrating a configuration of the display apparatus according to an embodiment.

Referring to FIG. 2, the display apparatus 100 may include a display 110, a memory 120, and one or more processors 130.

The display 110 is a constituent element for outputting the content in a visual form and may be implemented as various types of display such as liquid crystal display panel (LCD), light emitting diode (LED), organic light emitting diodes (OLED), liquid crystal on silicon (LCoS), digital light processing (DLP), and the like. In addition, the display 110 may also include a driving circuit or a backlight unit which may be implemented in a form of a-si TFT, a low temperature poly silicon (LTPS) TFT, or an organic TFT (OTFT). Further, The display 110 may be implemented as a touch screen by combining with a touch detector.

The memory 120 may store an operating system (OS) for controlling general operations of constituent elements of the display apparatus 100 and instructions or data related to the constituent elements of the display apparatus 100.

The memory 120 may be implemented in a form of a memory embedded in the display apparatus 100 or implemented in a form of a memory detachable from the display apparatus 100 according to data storage purpose. For example, data for operating the display apparatus 100 may be stored in a memory embedded in the display apparatus 100, and data for an extended function of the display apparatus 100 may be stored in a memory detachable from the display apparatus 100. The memory embedded in the display apparatus 100 may be implemented as at least one of a volatile memory (e.g., a dynamic RAM (DRAM), a static RAM (SRAM), a synchronous dynamic RAM (SDRAM), or the like), a non-volatile memory (e.g., one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard drive or a solid state drive (SSD), and the like, and the memory detachable from the display apparatus 100 may be implemented as a memory card (e.g., a compact flash (CF), secure digital (SD), a micro secure digital (Micro-SD), a mini secure digital (Mini-SD), extreme digital (xD), a multi-media card (MMC), or the like), an external memory connectable to a USB port (e.g., a USB memory), and the like.

For example, the memory 120 may store layout information for arranging and displaying a plurality of thumbnail images on the display 110.

The processor 130 is electrically connected to the display 110 and the memory 120 and may control general operations of the display apparatus 100.

According to an embodiment of the disclosure, the processor 130 may be implemented as a digital signal processor (DSP), a microprocessor, and a time controller (TCON) for processing digital image signals. However, there is no limitation thereto, and the processor may include one or more of a central processing unit (CPU), a microcontroller unit (MCU), a microprocessing unit (MPU), a controller, an application processor (AP), or a communication processor (CP), an ARM processor, and an artificial intelligence (AI) processor or may be defined as the corresponding term. In addition, the processor 130 may be implemented as System on Chip (SoC) or large scale integration (LSI) including the processing algorithm or may be implemented in a form of a field programmable gate array (FPGA). The processor 130 may perform various functions by executing computer executable instructions stored in the memory 120.

The processor 130 may control the display 110 to display the plurality of thumbnail images corresponding to the plurality of contents, respectively, based on the layout information stored in the memory 120.

In this case, the processor 130 may obtain the aspect ratio of each of the thumbnail images to be arranged in the same line according to the layout information, identify the majority of aspect ratios among the obtained aspect ratios, and control the display 110 to display the thumbnail images in a manner such that vertical lengths of the thumbnail images arranged in the same line have the length corresponding to the identified majority of aspect ratios. This will be described below in detail with reference to FIGS. 5 to 7.

The processor 130 may determine sizes of the plurality of thumbnail images differently according to the size of the display 110. For example, a thumbnail screen for displaying the plurality of thumbnail images may be displayed according to the size of the display 110, and therefore, as the size of the display 110 increases, the size of the thumbnail image may increase proportionally. In other words, the sizes of the plurality of thumbnail images displayed on the display 110 may be determined in proportion to the size of the display 110 mounted on the display apparatus 100.

If the size of the display 110 exceeds a predetermined standard, the processor 130 may control the display 110 to maintain the size of each of the plurality of thumbnail images as to a threshold value (or adjust the size to the threshold value) so that the number of thumbnail images displayed in one screen increases. This will be described below in detail with reference to FIG. 8.

Figure 3:
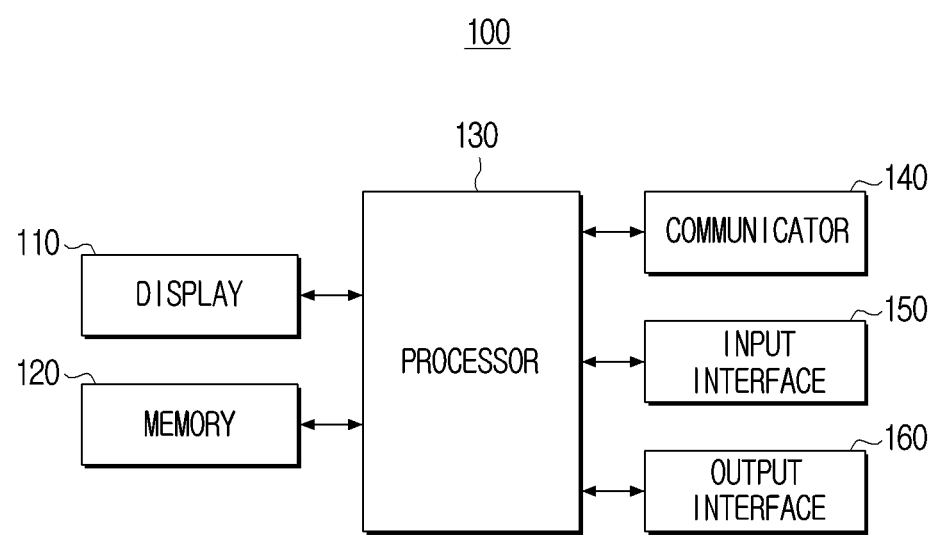
FIG. 3 is a block diagram illustrating a configuration of a display apparatus according to an embodiment.

FIG. 3 is a block diagram illustrating a configuration of a display apparatus 100 according to an embodiment.

Referring to FIG. 3, the display apparatus 100 may include the display 110, the memory 120, the processor 130, a communicator (or a communication interface) 140, an input interface 150, and an output interface 160. The detailed description of the constituent elements illustrated in FIG. 3 may be overlapped with those of the constituent elements illustrated in FIG. 2 will not be repeated.

The communicator 140 may communicate with an external apparatus to receive and transmit various data. For example, the communicator 140 may receive the contents from the server apparatus 200 and receive content related information such as a plurality of thumbnail images corresponding to a plurality of contents and metadata for the plurality of thumbnail images.

In this case, the metadata may include aspect ratio information of the thumbnail image, and the processor 130 may identify the aspect ratio of each of the plurality of thumbnail images using the aspect ratio information included in metadata received through the communicator 140. However, there is no limitation thereto, and for example, the processor 130 may obtain a horizontal pixel value and a vertical pixel value of the thumbnail image and calculate the aspect ratio based on the horizontal pixel value and the vertical pixel value of the thumbnail image.

The communicator 140 may perform the communication with an external apparatus through local area network (LAN), Internet network, or mobile communication network, and may also perform the communication with the external apparatus through various communication methods such as Bluetooth (BT), Bluetooth Low Energy (BLE), Wireless Fidelity (WI-FI), Wireless Fidelity Direct (WI-FI Direct), Zigbee, NFC, and the like. For this, the communicator 140 may include various communication modules for performing the network communication. For example, the communicator 140 may include a Bluetooth chip, a Wi-Fi chip, a wireless communication chip, and the like.

The input interface 150 may receive input of various user commands. For example, the input interface 150 may receive an input of a user command for controlling the display apparatus 100 or receive an input of a user command for transmission to the external apparatus. For example, the input interface 150 may include a microphone for receiving an input of a user utterance voice.

The output interface 160 may include at least one of a display and a speaker. Herein, the display is an apparatus which outputs information in a visual form (e.g., text, image, or the like). The display may display an image frame in the entire display area or a partial area thereof. The display area may refer to the entire area in a pixel unit in which information or data is displayed visually. The speaker is an apparatus which outputs information in an audible form (e.g., voice). The speaker may output not only various pieces of audio data obtained by executing various processing such as decoding, amplification, or noise filtering by an audio processor, but also various alerts or voice messages.

Figure 4:
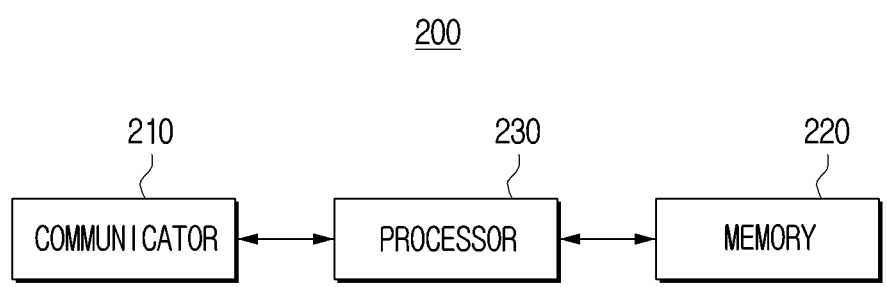
FIG. 4 is a block diagram illustrating a configuration of a server apparatus according to an embodiment.

FIG. 4 is a block diagram illustrating a configuration of a server apparatus 200 according to an embodiment.

Referring to FIG. 4, the server apparatus 200 may include a communicator (or communication interface) 210, a memory 220, and a processor 230.

The communicator 210 may transmit and receive data with the display apparatus 100.

The memory 220 may store data for performing the function of the server apparatus 200 and store a program, an instruction, or the like operated in the server apparatus 200. According to an embodiment of the disclosure, the memory 220 may store a content, a thumbnail image for the content, and layout information.

The processor 230 may control each constituent element of the server apparatus 200. According to an embodiment of the disclosure, the processor 230 may form a thumbnail screen based on information stored in the memory 220, and provide data for the thumbnail screen to the display apparatus 100 through the communicator 210.

The processor 230 may form the thumbnail screen to display the thumbnail images arranged in the same line in the thumbnail screen in a manner such that vertical lengths of the thumbnail images have the length corresponding to the majority of aspect ratios among the aspect ratios of the thumbnail images arranged in the same line.

For example, the processor 230 may form the thumbnail screen to display the vertical lengths of all thumbnail images arranged in the same line as a first length, when the thumbnail images having the aspect ratio of 2:3 form a majority among the thumbnail images arranged in the same line in the thumbnail screen, and to display the vertical lengths of all thumbnail images arranged in the same line as a second length which is shorter than the first length, when the thumbnail images having the aspect ratio of 16:9 form a majority among the thumbnail images arranged in the same line.

The operation of the server apparatus 200 is not limited to the description above and various operations processed through the display apparatus 100 of the disclosure may also be processed by the server apparatus 200.

Figure 5:
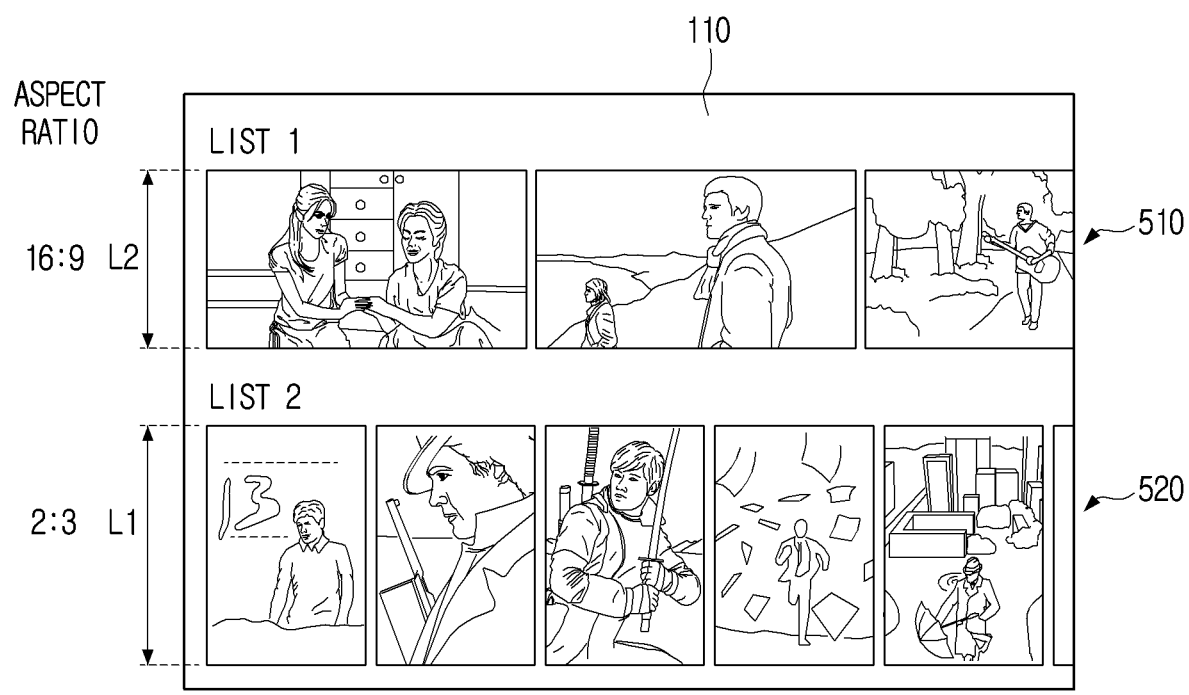
FIG. 5 is a diagram illustrating an example of a screen displayed with thumbnail images having various aspect ratios according to an embodiment.

FIG. 5 is a diagram illustrating a screen displayed with thumbnail images having various aspect ratios according to an embodiment.

According to an embodiment of the disclosure, the display apparatus 100 may classify thumbnail images having the same aspect ratio among the plurality of thumbnail images, arrange the classified thumbnail images along the same line and display the thumbnail images in a manner such that thumbnail images arranged in different rows have different vertical lengths.

FIG. 5 illustrates a layout in which the plurality of thumbnail images having the aspect ratio of 16:9 are arranged in a first row 510 and the plurality of thumbnail images having the aspect ratio of 2:3 are arranged in a second row 520.

The display apparatus 100 may display the vertical lengths of the plurality of thumbnail images differently according to the aspect ratios. For example, the display apparatus may display the vertical length of the thumbnail image having the aspect ratio of 2:3 as a first length L1 and display the vertical length of the thumbnail image having the aspect ratio of 16:9 as a second length L2.

The horizontal length of each thumbnail image herein may be adjusted to maintain the initial aspect ratio of the thumbnail image, based on the vertical length being determined for the thumbnail images to be arranged in the same row. For example, when the vertical length of the thumbnail image having the aspect ratio of 2:3 is determined as L1, the horizontal length thereof may be determined to L1*(2/3).

The vertical length of each of the plurality of thumbnail images may be determined according to the aspect ratio of each thumbnail image. In this case, the vertical length of the thumbnail image, of which the aspect ratio is such that the vertical length is longer than the horizontal length (e.g., thumbnail image having a ratio of 2:3), may be determined to be longer than the vertical length of the thumbnail image, of which the aspect ratio is such that the vertical length is shorter than the horizontal length (e.g., thumbnail image having a ratio of 16:9).

For example, the vertical length of the thumbnail image having a first aspect ratio with the vertical length longer than the horizontal length among the plurality of thumbnail images may be set to the first length L1, and the vertical length of the thumbnail image having a second aspect ratio with the horizontal length longer than the vertical length among the plurality of thumbnail images may be set to the second length L2 which is shorter than the first length L1.

Accordingly, it is possible to solve the problem that the thumbnail image having a relatively short horizontal length may not be properly displayed, when displaying the thumbnail image having the horizontal length longer than the vertical length (e.g., image having a ratio of 16:9) and the thumbnail image having the horizontal length shorter than the vertical length (e.g., image having a ratio of 2:3).

According to the standard for classifying the contents, the thumbnail images having different aspect ratios may be arranged in the same line in sequence.

Figure 6:
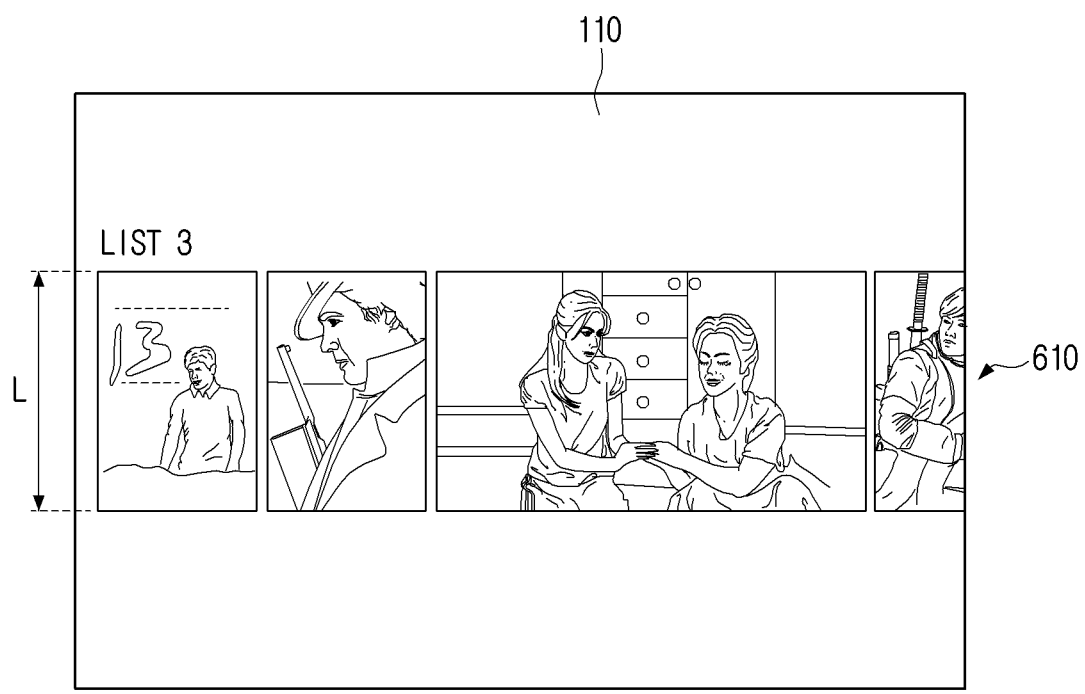
FIG. 6 is diagram illustrating an example of a screen on which thumbnail images having various aspect ratios are arranged along the same line according to an embodiment.

FIG. 6 is diagram illustrating a screen on which thumbnail images having various aspect ratios are arranged in the same line according to an embodiment.

Referring to FIG. 6, thumbnail images having different aspect ratios are displayed in the same row 610. According to an embodiment, a method for determining the vertical length L to be applied to the thumbnail images arranged in the same row (e.g., row 610) will be described.

According to an embodiment of the disclosure, the display apparatus 100 may identify the thumbnail images to be arranged in the same line according to the layout information, identify a majority of an aspect ratio (e.g., an aspect ratio of a preset threshold ratio or greater among aspect ratios of the thumbnail images in the row 610) among aspect ratios of the thumbnail images to be arranged in the same line, and display the vertical lengths of the thumbnail images arranged in the same line as the length corresponding to the identified majority of aspect ratio.

Figure 7:
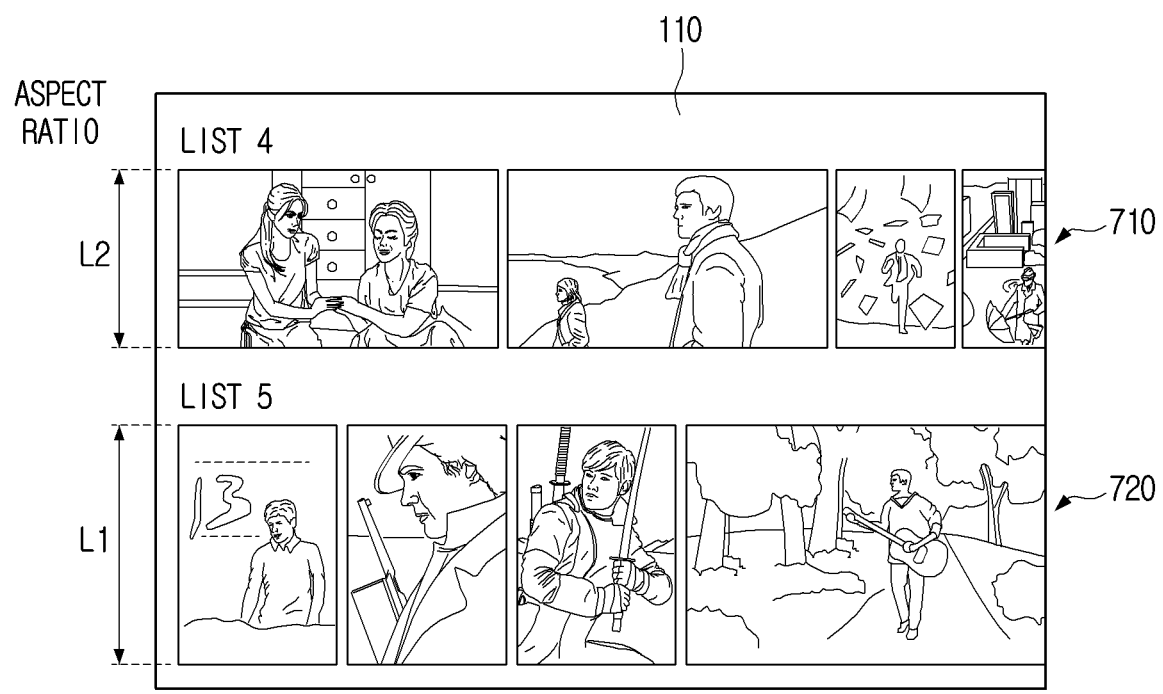
FIG. 7 is diagram illustrating an example of a screen on which thumbnail images are displayed by changing sizes of the thumbnail images according to an embodiment.

FIG. 7 is diagram illustrating a screen on which thumbnail images are displayed by changing sizes of the thumbnail images in a manner such that the thumbnail images arranged in the same line has a vertical length that corresponds to the majority of an aspect ratio among aspect ratios of the thumbnail images.

According to an embodiment of the disclosure, if the thumbnail images having the aspect ratio of a horizontal length to a vertical length of 2:3 form the majority of thumbnail images arranged in the same line, the display apparatus may display the vertical length of all thumbnail images arranged in the same line as the first length L1, and if the thumbnail images having the aspect ratio a horizontal length to a vertical length of 16:9 form the majority of thumbnail images arranged in the same line, the display apparatus may display the vertical length of all thumbnail images arranged in the same line as the second length L2 shorter than the first length L1.

Referring to FIG. 7, the thumbnail images having the aspect ratio of 16:9 form the majority of thumbnail images arranged in a first row 710, and accordingly, the vertical length of the thumbnail images arranged in the first row 710 may be determined as the second vertical length L2 which is the vertical length corresponding to the aspect ratio of 16:9.

On the other hand, the thumbnail images having the aspect ratio of 2:3 form the majority of thumbnail images arranged in a second row 720, and accordingly, the vertical length of the thumbnail images arranged in the second row 720 may be determined as the first vertical length L1 which is the vertical length corresponding to the aspect ratio of 2:3.

Figure 8:
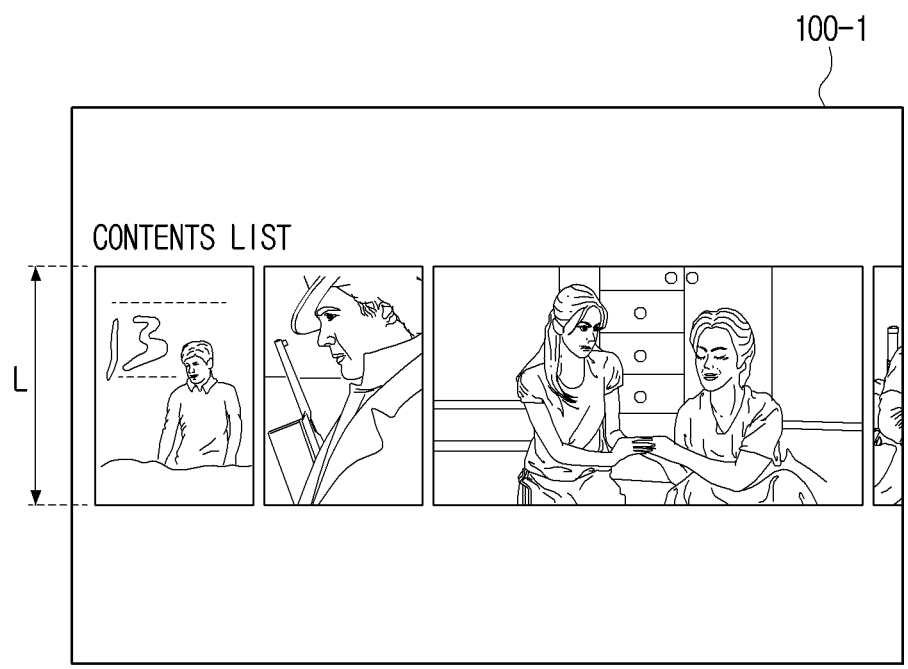
FIG. 8 is a diagram illustrating an operation of adjusting sizes of thumbnail images according to a size of a display of a display apparatus according to an embodiment.
Figure 8:
Figure 8:

FIG. 8 is a diagram illustrating an operation of adjusting sizes of thumbnail images according to the size of the display of the display apparatus according to an embodiment.

According to an embodiment of the disclosure, when the size of the display 110 exceeds a predetermined standard, the display apparatus 100 may control the display 110 to maintain the size of each of the plurality of thumbnail images to a threshold value so that the number of thumbnail images displayed in one screen increases.

For example, if the predetermined standard of the size of the display 110 is 100" (e.g., if a diagonal length of the display 110 is 100 inches) and the size of the display 110 is 100" or less, the size of each of the plurality of thumbnail images may be determined differently in proportion to the size of the display 110. The thumbnail screen displaying the plurality of thumbnail images may be displayed according to the size of the display 110, and accordingly, as the size of the display 110 increases, the size of the thumbnail image increases proportionally. In other words, the sizes of the plurality of thumbnail images displayed on the display 110 may be determined in proportion to the size of the display 110 mounted on the display apparatus 100.

When the size of the display 110 exceeds 100", the size of the thumbnail image displayed on the display 110 may be maintained as a threshold value L'.

Referring to FIG. 8, a display apparatus 100-2 having a size of a display exceeding the predetermined standard may display a larger number of contents on one screen, compared to a display apparatus 100-1 having a size of a display smaller than the predetermined standard, and thus it is possible to utilize a large-scale display apparatus capable of displaying a larger number of contents while preventing the size of the thumbnail image from excessively increasing on the large-scale display apparatus.

Figure 9:
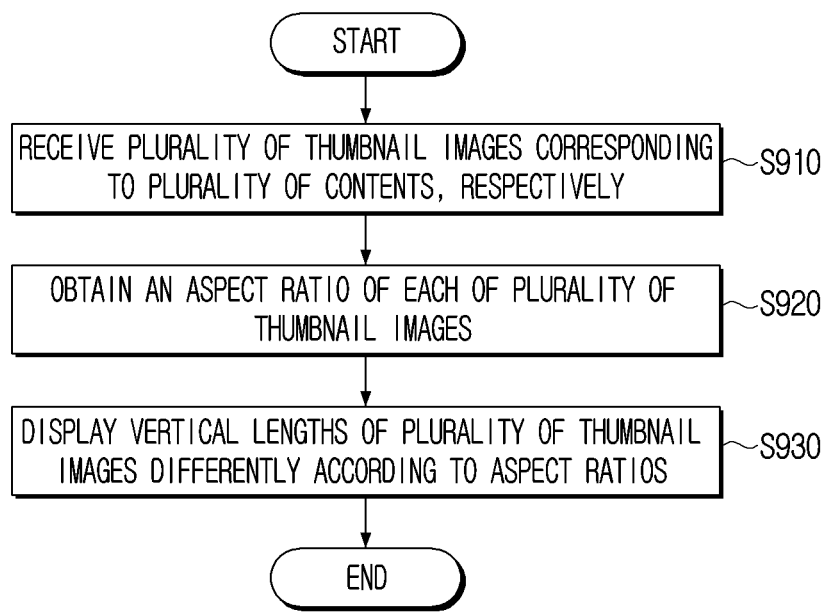
FIG. 9 is a flowchart illustrating a thumbnail image display method according to an embodiment.

FIG. 9 is a flowchart illustrating a thumbnail image display method according to an embodiment.

Referring to FIG. 9, the thumbnail image display method according to an embodiment of the disclosure may include receiving a plurality of thumbnail images corresponding to a plurality of contents, respectively (S910), obtaining an aspect ratio of each of the plurality of thumbnail images (S920), and displaying vertical lengths of the plurality of thumbnail images differently according to the aspect ratios (S930).

First, the display apparatus may receive the plurality of thumbnail images corresponding to the plurality of contents, respectively (S910).

In addition, the display apparatus may obtain the aspect ratio of each of the plurality of thumbnail images (S920).

Further, the display apparatus may display the vertical lengths of the plurality of thumbnail images differently according to the aspect ratios (S930). For example, the display apparatus may display the plurality of thumbnail images of which vertical lengths are controlled differently according to the aspect ratios of the plurality of thumbnail images.

The display apparatus may set a vertical length of a thumbnail image having a first aspect ratio, in which a vertical length is longer than a horizontal length, among the plurality of thumbnail images to a first length, and set a vertical length of a thumbnail image having a second aspect ratio, in which a horizontal length is longer than a vertical length, among the plurality of thumbnail images to a second length which is shorter than the first length.

In this case, the display apparatus may classify thumbnail images having the same aspect ratio among the plurality of thumbnail images to be arranged along the same line and display the thumbnail images with vertical lengths different for each line.

The display apparatus may identify thumbnail images arranged in the same line according to layout information, identify a majority of an aspect ratio among aspect ratios of the thumbnail images arranged in the same line, and display the thumbnail images arranged in the same line to have a vertical length corresponding to the identified majority of an aspect ratio.

Herein, the display apparatus may, if the thumbnail images having the aspect ratio of 2:3 form the majority of thumbnail images arranged in the same line, display a vertical length of all thumbnail images arranged in the same line as the first length, and if the thumbnail images having the aspect ratio of 16:9 form the majority of thumbnail images arranged in the same line, display the vertical length of all thumbnail images arranged in the same line as a second length shorter than the first length. Accordingly, the display apparatus may display the thumbnail images having the aspect ratio that forms a majority of aspect ratios of the thumbnail images arranged in the same line in a suitable size, and also align the remaining thumbnail images having other aspect ratios in a size adjusted to have the same vertical length as those of the thumbnail images having the majority aspect ratio.

The display apparatus may, if the size of the display does not exceed a predetermined standard, determine sizes of the plurality of thumbnail images differently in proportion to a size of a display provided in the display apparatus, and if the size of the display exceeds the predetermined standard, determine the size of each of the plurality of thumbnail images as a threshold value. Accordingly, the number of thumbnail images displayed on one screen of the display apparatus having a size larger than the predetermined standard may increase.

Computer instructions for executing processing operations according to the embodiments of the disclosure descried above may be stored in a non-transitory computer-readable medium. When the computer instructions stored in such a non-transitory computer-readable medium are executed by the processor of a specific machine, the computer instructions of the display apparatus according to various embodiments described above may be executed by the specific machine.

The non-transitory computer-readable medium may not include a medium storing data for a short period of time such as a register, a cache, or a memory, but may include a medium that semi-permanently stores data and is readable by a machine. Specifically, the various applications or programs described above may be stored and provided in the non-transitory computer-readable medium such as a CD, a DVD, a hard disk drive, a Blu-ray disc, a USB, a memory card, and a ROM.

The methods according to various embodiments may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of an on-line distribution, at least a part of the computer program product may be at least temporarily stored or temporarily generated in a storage medium such as a memory of a server of a manufacturer, a server of an application store, or a relay server.

At least one of the components, elements or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display apparatus comprising:
    a display;
    a memory configured to store layout information; and
    one or more processors configured to, based on the layout information, control the display to display a plurality of thumbnail images corresponding to a plurality of contents, respectively,
    wherein the one or more processors is further configured to:
    obtain aspect ratios of thumbnail images, which are to be arranged in a same line according to the layout information, among the plurality of thumbnail images;
    select, as a majority aspect ratio, an aspect ratio of which a number of thumbnail images corresponding thereto is a majority of a total number of the thumbnail images to be arranged in the same line, among the obtained aspect ratios;
    based on the majority aspect ratio being such that a vertical length is longer than a horizontal length, control the display to display the thumbnail images arranged in the same line to have a first vertical length; and
    based on the majority aspect ratio being such that the horizontal length is longer than the vertical length, control the display to display the thumbnail images arranged in the same line to have a second vertical length, which is less than the first vertical length.

2. The display apparatus according to claim 1, wherein the one or more processors is further configured to:
    based on a size of the display not exceeding a predetermined standard, determine sizes of the plurality of thumbnail images in proportion to the size of the display; and
    based on the size of the display exceeding the predetermined standard, determine a size of each thumbnail image of the plurality of thumbnail images as a threshold value.

3. The display apparatus according to claim 1, wherein the one or more processors is further configured to:
    based on the majority aspect ratio of the horizontal length to the vertical length being 2:3, control the display to display the thumbnail images arranged in the same line to have the first vertical length; and
    based on the majority aspect ratio of the horizontal length to the vertical length being 16:9, control the display to display the thumbnail images arranged in the same line to have the second vertical length, which is less than the first vertical length, while a total number of the thumbnail images arranged in the same line and displayed is maintained.

4. The display apparatus according to claim 1, further comprising:
    a communication interface configured to receive, from a server apparatus, the plurality of thumbnail images and metadata related to the plurality of thumbnail images,
    wherein the one or more processors is further configured to identify an aspect ratio of each thumbnail image of the plurality of thumbnail images based on the metadata.

5. A method of displaying a thumbnail image in a display apparatus, the method comprising:
    obtaining a plurality of thumbnail images corresponding to a plurality of contents, respectively;
    obtaining aspect ratios of thumbnail images, which are to be arranged in a same line according to layout information, among the plurality of thumbnail images;
    selecting, as a majority aspect ratio, an aspect ratio of which a number of thumbnail images corresponding thereto is a majority of a total number of the thumbnail images to be arranged in the same line;
    based on the majority aspect ratio being such that a vertical length is longer than a horizontal length, displaying the thumbnail images arranged in the same line to have a first vertical length; and
    based on the majority aspect ratio being such that the horizontal length is longer than the vertical length, displaying the thumbnail images arranged in the same line to have a second vertical length, which is less than the first vertical length.

6. The method according to claim 5,
    wherein the displaying the thumbnail images arranged in the same line to have the first vertical length comprises displaying, based on the majority aspect ratio being 2:3, the thumbnail images arranged in the same line to have the first vertical length, and
    wherein the displaying the thumbnail images arranged in the same line to have the second vertical length comprises displaying, based on the majority aspect ratio being 16:9, the thumbnail images arranged in the same line to have the second vertical length, which is shorter than the first vertical length, while a total number of the thumbnail images arranged in the same line and displayed is maintained.

7. The method according to claim 5, further comprising:
    based on a size of a display provided in the display apparatus not exceeding a predetermined standard, determining sizes of the plurality of thumbnail images in proportion to the size of the display; and based on the size of the display exceeding the predetermined standard, determining a size of each thumbnail image of the plurality of thumbnail images as a threshold value.

8. The method according to claim 5, further comprising:

classifying thumbnail images having a same aspect ratio among the plurality of thumbnail images, and displaying the classified thumbnail images arranged in the same line, wherein the classified thumbnail images arranged in different lines have different vertical lengths.

9. A server apparatus comprising:

a communication interface configured to perform communication with a display apparatus;

a memory configured to store a content, a thumbnail image for the content, and layout information; and one or more processors configured to provide data for a thumbnail screen to the display apparatus via the communication interface, based on the thumbnail screen being stored in the memory, wherein the thumbnail screen is such that vertical lengths of thumbnail images arranged in the same line in the thumbnail screen have a length corresponding to a majority aspect ratio among aspect ratios of the thumbnail images arranged along the same line, wherein the majority aspect ratio is an aspect ratio selected among the obtained aspect ratios, wherein a number of thumbnail images having the majority aspect ratio is a majority of a total number of the thumbnail images to be arranged in the same line, and wherein the one or more processors are further configured to:

based on the majority aspect ratio being such that a vertical length is longer than a horizontal length, provide the thumbnail screen including the thumbnail images arranged in the same line to have a first vertical length; and based on the majority aspect ratio being such that the horizontal length is longer than the vertical length, provide the thumbnail screen including the thumbnail images arranged in the same line to have a second vertical length, which is shorter than the first vertical length.

10. The server apparatus according to claim 9, wherein the one or more processors are further configured to:

based on the majority aspect ratio being 2:3, provide the thumbnail screen including the thumbnail images arranged in the same line to have the first vertical length; and based on the majority aspect ratio being 16:9, provide the thumbnail screen including the thumbnail images arranged in the same line to have the second vertical length, which is shorter than the first vertical length, while a total number of the thumbnail images arranged in the same line and displayed in the thumbnail screen is maintained.

* * * * *